June 7, 1966   J. R. FRYAR ETAL   3,254,473
DEHYDRATION OF GASES AND REGENERATION OF DESICCANT
Filed July 29, 1963

INVENTORS
J.R. FRYAR
J.S. CONNORS
BY
Young and Quigg
ATTORNEYS

United States Patent Office 3,254,473
Patented June 7, 1966

3,254,473
DEHYDRATION OF GASES AND REGENERATION OF DESICCANT
Jack R. Fryar, Borger, Tex., and James S. Connors, Bartlesville, Okla., assignors to Phillips Petroleum Company, a corporation of Delaware
Filed July 29, 1963, Ser. No. 298,233
11 Claims. (Cl. 55—32)

This invention relates to the dehydration of gases. In one aspect this invention relates to the dehydration of gases employing a liquid desiccant and the regeneration of said desiccant.

Natural gas, while usually composed predominantly of methane, also usually contains appreciable quantities of easily liquefied petroleum gases (LPG), and frequently contains significant amounts of higher boiling normally liquid hydrocarbons having up to 10 to 15 or more carbon atoms per molecule.

The processing of natural gas to recover said normally liquid hydrocarbons and the relatively easily liquefied petroleum gases (LPG) therefrom has developed into a very important factor in the nation's fuel economy. In the early days of the industry the first plants for so processing natural gases were designed to recover only the gasoline components, i.e., those components which were normally liquid at ordinary conditions of temperature and pressure, or which were liquid at pressures slightly above atmospheric. As the industry developed, plants were designed to recover the $C_4$ hydrocarbons, such as butane, and today substantially all of the butane is recovered. In recent years, the demand for liquefied petroleum gases has increased to the point where more and more of the $C_3$ hydrocarbons, e.g., propane, are being recovered. Today, recovery of 80 to 85 percent of the propane in natural gas is common. In still more recent years, the recovery of the $C_2$ hydrocarbons, e.g., ethane, has become increasingly important because of the use of said $C_2$ hydrocarbons as starting materials in a great number of petrochemical processes.

As the demand for the $C_2$ and $C_3$ hydrocarbons has increased, the plant operators have increased the operating pressure and have applied more refrigeration in the absorption plants to increase the recovery of said $C_2$ and $C_3$ hydrocarbons. In some such processes, not only is the hydrocarbon absorbent cooled, but the gas being treated is also cooled prior to being contacted with said absorbent. This cooling of the gas has encountered difficulties due to hydrate formation because natural gas flowing from wells is ordinarily saturated with water. These hydrates impede the free passage of the gas along transfer lines and particularly through constrictions such as in the heat exchange apparatus employed in cooling the gases. Usually, the first hydrate formation is small but as the hydrate is formed it acts as seed for further accumulation which grows to such an extent that free passage of the gas is seriously impeded and often ultimately stopped.

A known method of removing moisture from natural gas so as to prevent hydrate formation comprises contacting said gas with a suitable liquid desiccant such as an alkylene glycol. Said desiccant is usually thereafter regenerated or revivified by heating in a rectifier or reflux column to remove the acquired moisture. After being regenerated the desiccant can be recycled and used for further moisture removal.

This treatment for dehydration of gases with a suitable liquid desiccant has come to be rather commonly employed. In many systems the process operates quite satisfactorily without difficulties. However, in a number of fields where the gas contains a significantly greater proportion of the higher boiling normally liquid hydrocarbons, and particularly aromatic hydrocarbons, it has been found that the liquid desiccant absorbs an appreciable amount of said higher boiling hydrocarbons. When the liquid desiccant containing these dissolved or absorbed higher boiling hydrocarbons is regenerated, said higher boiling hydrocarbons are desorbed therefrom. Since said hydrocarbons are of lower density than the desiccant, they build up as a layer on top of the desiccant in the regeneration equipment such as in the reboiler and/or the regenerated desiccant accumulator. Said separated higher boiling hydrocarbons are ultimately withdrawn with the regenerated desiccant and contaminate same resulting in reduced efficiency when the regenerated desiccant is recycled to the dehydration step. In some instances, the amount of higher boiling hydrocarbons so separated and accumulated is so great and the problem is so severe as to require periodic shutdown of the regeneration equipment to dispose of said hydrocarbons.

The present invention provides a method for overcoming the above-described difficulties. We have discovered that said difficulties can be eliminated by stripping or removing the hydrocarbons from the wet or spent desiccant prior to removing the water from the wet desiccant. Thus, broadly speaking, the present invention resides in (1) the concept of heating the wet or spent desiccant containing dissolved or absorbed hydrocarbons to a temperature sufficient to desorb said hydrocarbons but which is insufficient to remove water, and then passing the thus treated desiccant into a regeneration zone for removal of water; and (2) combinations of apparatus which can be employed in the practice of the invention.

An object of this invention is to provide an improved process for dehydrating gases such as natural gas. Another object of this invention is to provide an improved method for regenerating a spent liquid desiccant. Still another object of this invention is to provide a combination of apparatus which can be employed in the dehydration of gases and in the regeneration of the liquid desiccant employed in said dehydration. Still another object of this invention is to provide a method for removing dissolved hydrocarbon from a wet liquid desiccant prior to regenerating said desiccant to remove water therefrom. Other aspects, objects, and advantages of the invention will be apparent to those skilled in the art in view of this disclosure.

Thus, according to the invention, there is provided a process for the dehydration of gases containing moisture, which process comprises: contacting said gases with a liquid desiccant to dry said gases and form a wet desiccant phase containing dissolved hydrocarbons; applying sufficient heat to said wet desiccant phase to cause separation of dissolved hydrocarbons therefrom but insufficient to cause separation of water vapor therefrom; passing said heated wet desiccant to a desiccant regeneration zone; in said regeneration zone, applying sufficient additional heat to said heated wet desiccant to cause separation of water vapor therefrom and produce a regenerated desiccant; and recycling said regenerated desiccant to said contacting step.

Further according to the invention, there are provided combinations of apparatus which can be employed in carrying out the above-described method.

Figures 1, 2:
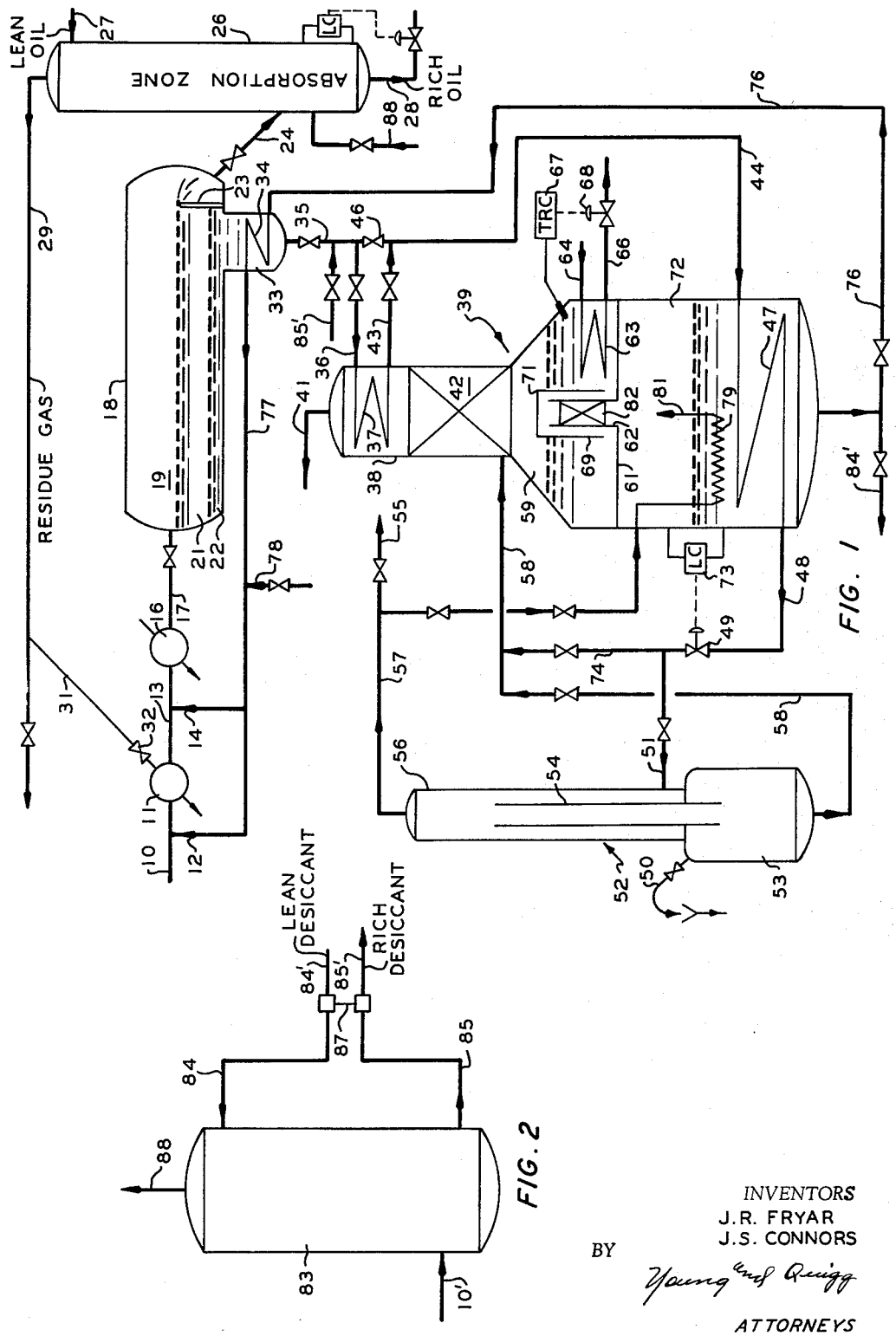
FIGURE 1 is a diagrammatic flow sheet illustrating various embodiments of the method of the invention and schematically illustrating combinations of apparatus which can be employed in the practice of the invention.
FIGURE 2 is a partial flow sheet which, when combined with portions of FIGURE 1 as discussed hereinafter, illustrates other embodiments of the invention.

Referring now to said drawings, the invention will be more fully explained. Many valves, pumps, pressure gauges, control apparatus, etc., not necessary in explaining the invention to those skilled in the art, have been omitted for the sake of brevity. In FIGURE 1 a stream of a feed gas, such as natural gas from a well not shown, is passed via conduit 10 into chiller or heat exchanger 11. Prior to being introduced into said chiller 11 said gas is mixed with a stream of a suitable liquid desiccant introduced into said conduit 10 via conduit 12. The resulting mixture is passed through said chiller 11 wherein contact between said gases and said glycol is effected, and is then passed via conduit 13 wherein it is mixed with additional desiccant introduced via conduit 14. The resulting mixture is then introduced into heat exchanger or chiller 16 wherein additional contacting between the gas and the desiccant is effected. In said chillers 11 and 16 the temperature of said gases can be reduced to any desired operating temperature. While two chillers have been illustrated, it is within the scope of the invention to employ only one chiller or more than two chillers.

A portion of said gases is condensed in said chillers and the resulting mixture of gas, condensate, and wet desiccant is passed via conduit 17 into separator vessel 18 wherein phase separation between said gas, said condensate, and said wet desiccant takes place with the formation of a substantially dry gas phase 19, a hydrocarbon or condensate phase 21, and a wet desiccant phase 22 containing dissolved water and hydrocarbons.

In said separator 18 the gas phase and the condensate phase pass over weir 23 and flow through conduit 24 into an absorption zone represented by absorber 26. Flow through conduit 24 is by gravity and said conduit is of such size as to accommodate liquid flow along the bottom and vapor flow in the upper part of said conduit. Fluids from conduit 24 enter absorber 26 at a point above the liquid level therein. In said absorption zone the dry gases are contacted countercurrently with a lean absorption oil introduced via conduit 27. Said absorption oil can be any suitable oil known in the art for absorbing hydrocarbons such as ethane, propane, and butane from a mixture of gases such as natural gas. The rich absorption oil containing the absorbed hydrocarbons is removed from absorption zone 26 via conduit 28 and passed to stripping apparatus (not shown) for recovery of the absorbed hydrocarbons in known and conventional manner, and the lean absorption oil is recycled via said conduit 27. A residue gas comprising unabsorbed hydrocarbons is withdrawn from absorption zone 26 via conduit 29 and passed to a pipeline for distribution, to storage, or other use. If desired, a portion of said residue gas can be passed via conduit 31 and a suitable expansion valve 32 into said chiller 11 as the refrigerant employed therein. It will be understood that said absorption zone, while here illustrated as a single absorber 26, can comprise any suitable number of absorbers operated either in parallel or in series.

It will be noted that said separator 18 is provided with a leg 33 attached to and in open communication with the bottom portion thereof. The desiccant phase in separator 18 is withdrawn from said separator through said leg 33. Immediately prior to being withdrawn or during the withdrawal step said desiccant is heated in said leg 33 to a temperature sufficient to cause desorption of dissolved and/or absorbed higher boiling hydrocarbons and gases contained therein but which temperature is insufficient to remove water from desiccant. The heating of said desiccant is effected by means of heating coil 34 disposed in said leg 33 and through which hot lean desiccant is passed, as described further hereinafter. Upon being desorbed said gases and higher boiling hydrocarbons pass upwardly through the desiccant phase 22 and enter the hydrocarbon or condensate phase 21, and are withdrawn from separator 18 with said condensate phase and gas phase 19 as described above.

Heated desiccant phase from leg 33, now essentially free of dissolved gases and higher boiling hydrocarbons, is passed via conduit 35 and conduit 36 into coil 37 in the tower portion 38 of regeneration vessel 39. In the practice of the invention, the desiccant passing through coil 37 will remove heat from the vapors passing upwardly through tower 38 around said coil 37 and ultimately out of said tower via conduit 41. This creates a reflux for wetting down of the packing 42 in tower portion 38 and prevents desiccant vapors from being removed via conduit 41 along with water vapor. Said packing 42 can be any suitable type of vapor-liquid contact material such as Raschig rings, Burl saddles, etc. It is also within the scope of the invention to employ other vapor-liquid contacting means such as bubble caps on trays. The desiccant from coil 37 is passed via conduit 43 into conduit 44. At least a portion, when desired, of the wet desiccant in conduit 35 can be passed directly into said conduit 44 by control of valve 46. If desired, it is within the scope of the invention to pass all of the desiccant from conduit 35 directly into conduit 44 in this manner by closing the valves shown in conduits 36 and 43. Usually, however, from 15 to 70 percent of the desiccant in conduit 35 is passed through coil 37.

In one embodiment of the invention, desiccant in conduit 44 is passed through heat exchange coil 47 located in the bottom portion of lower section 72 of vessel 39, through conduit 48, through control valve 49, and through conduit 51 into a gas-liquid separator 52. Said gas-liquid separator comprises an enlarged vessel section or lower vessel 53 having both ends closed. A tube or overflow pipe 54 extends from an upper vessel 56 through the upper wall of lower vessel 53 and into said lower vessel. Said upper vessel 56 is the actual gas-liquid separator because liquid introduced into said upper vessel via conduit 51 permits any remaining gas to separate from said liquid with the gas being withdrawn through overhead conduit 57 while the separated liquid overflows downwardly through pipe 54 into said lower vessel 53. In some instances the additional heating of the liquid desiccant afforded by heat exchange coil 47 (which is at a higher temperature than coil 37) will cause an additional amount of dissolved or absorbed higher boiling hydrocarbons to be desorbed from the desiccant. In such instances the separated higher boiling hydrocarbons will accumulate in the upper portion of lower vessel 53 and can be withdrawn via conduit 50. The use of gas-liquid separator 52 in combination with leg 33 of separator 18 thus provides additional protection against separation and accumulation of higher boiling hydrocarbons in regenerator 39 when the liquid desiccant, for practical operating reasons, cannot be heated sufficiently in leg 33 to cause separation or desorption of all the higher boiling hydrocarbons. The liquid desiccant in lower vesselt 53 is withdrawn via conduit 58 and introduced into the packed section of said tower portion 38. Said liquid desiccant passes downwardly into intermediate section 59 of vessel 39 which is formed by means of partition 61 and riser or downcomer pipe 62. Said section 59 contains a heat exchanger or heating coil 63 to which steam or other heat exchange medium is introduced via conduit 64 and removed via conduit 66. The temperature of the liquid desiccant in section 59 can be controlled by means of temperature recorder controller 67 which is operatively connected to control valve 68 disposed in said conduit 66. If so desired, depending upon the nature of the heating medium, said control valve 68 can be disposed in conduit 64. Said heating coil 63 supplies heat to boil the water out of the liquid desiccant in section 59.

Said riser or downcomer pipe 62 extends upwardly to a level which is desirably above the level of heating coil 63 and thus serves to maintain a level of liquid desiccant in section 59 which covers heating coil 63. A pipe 69, covered at its upper end by means of cap 71, surrounds riser or downcomer piper 62 and provides communication between the bottom of section 59 and the upper end of said riser or downcomer pipe 62. Said cap 71 prevents downflowing desiccant from tower portion 38 entering pipe 62. Although not shown in the drawing, it will be understood that cap 71 is provided with a vent hole in the top thereof, or is fixed to pipe 62 in a manner to permit equalization of pressure between sections, 59 and 72 of vessel 39. The arrangement of pipes 62 and 69 permits the most concentrated desiccant liquid to be drawn off from the bottom of section 59 by overflow passed through pipe 62 into the lower surge or accumulator section 72 in the lower portion of vessel 39.

It will be noted that by the use of pipes 62 and 69 there is accomplished a downflow of liquid past heat exchanger coil 63. This provides very efficient heat exchange and allows the drawing off of the most concentrated material from the bottom of section 59. It will be understood by those skilled in the art in possession of this disclosure and having studied the same that several pipes 62 and 69 can be provided in section 59. It is within the scope of the invention to modify pipes 62 and 69 to remove regenerated liquid desiccant from any level within said section 59. Several removal levels can be operated at one time depending upon the particular type of heating, degree of turbulence, or convection, etc. Liquid level controller 73 maintains a constant level of lean or regenerated desiccant in section 72 by controlling the amount of glycol passed through conduits 44, 48, and into gas-liquid separator 52.

Lean or regenerated desiccant is withdrawn from lower section 72 via conduit 76, passed through heating coil 34 in leg 33 of separator 18, and then passed via conduit 77 into said conduits 12 and 14 for mixing with the moisture-containing feed gas as described above. Make-up desiccant can be introduced into the system via conduit 78.

In another embodiment of the invention, if desired, said gas-liquid separator 52 can be bypassed by means of bypass conduit 74, and the valve arrangements shown, and the desiccant in conduit 48 introduced into conduit 58 for introduction into packed section 42 of tower portion 38.

In still another embodiment of the invention, the gas separated from the liquid desiccant in gas-liquid separator 52 can be passed via conduit 57 and heat exchange coil 79 disposed below the level of liquid in section 72 of vessel 39, and then introduced into the open space of said section 72 by means of nozzle 81 as stripping gas for the concentrated liquid desiccant flowing downwardly through pipe 62. In this embodiment of the invention, the interior of pipe 62 is provided with a packed section 82 to provide intimate contact between the downflowing liquid and the upflowing stripping gas. This stripping action provides a "super drying" section which makes possible the obtaining of extra high purity desiccant in section 72. This high purity desiccant is advantageous where it is desired that the dehydrated gas have an unusually low dew point.

The invention is also applicable to those processes wherein the feed gas in conduit 10 and desiccant are not prechilled to low temperatures as in said chillers 11 and 16. This embodiment of the invention is illustrated in FIGURE 2 wherein the feed gas from conduit 10' is introduced into a contactor or absorption vessel 83 wherein it is contacted countercurrently with lean liquid desiccant introduced via conduit 84. Rich or moisture-laden desiccant is withdrawn via conduit 85 and passed through the power end of a Kimray pump 87 wherein it is expanded and drives said pump and furnishes the power for pumping the lean desiccant in conduit 84. Such a pump, suitable for use in the practice of the invention, is manufactured by Kimray Inc., Oklahoma City, Okla., and is described in their Catalog No. 59 as a glycol pump. As said rich desiccant is expanded in the power end of said pump, dissolved gases contained therein come out of solution and are subsequently employed as stripping gas.

The rich desiccant from pump 87 is passed via conduit 85' into conduit 35, previously described, and lean desiccant conduit 84' is connected to lean or regenerated desiccant conduit 76, previously described. Rich desiccant in conduit 35 is passed through heat exchange coil 47 in regenerator 39 and then passed through gas-liquid separator 52 for separation of gas and liquid with the separated gas being employed as stripping gas as previously described. Said stripping gas can be employed in any suitable amount, usually from about 3 to 15 cubic feet per gallon of desiccant being regenerated. This embodiment of the invention is particularly applicable for treating a feed gas such as a residue gas which is to be introduced into a pipeline which requires a particularly low dew point on the gas. The system is also applicable for the dehydration of other gases which are to be subsequently treated for the recovery of various components. Thus, it is within the scope of the invention to pass the gases from conduit 88, either with or without chilling, to a subsequent treating step such as an absorber 26 as shown in FIGURE 1. It will be understood that in this embodiment of the invention lean desiccant conduits 84 and 84' are provided with suitable heat exchange or other cooling means (not shown) for obtaining the desired temperature of the desiccant introduced into contactor 83. Likewise, rich desiccant conduit 85' can be provided with additional heat exchange or other heating means for increasing or controlling the temperature of the rich desciccant prior to introduction into regenerator 39.

One requirement of a desiccant obviously is that it must be chemically inert with respect to the gas being treated. Likewise, the desiccant preferably should be noncorrosive to conventional steel equipment so that special chemically resistant equipment need not be used. Any suitable liquid desiccant meeting the above requirements can be employed in the practice of the invention. Examples of suitable desiccants include the alkylene glycols such as ethylene glycol, diethylene glycol, triethylene gycol, and the like. Other desiccants which can be employed include normal butyl alcohol, isobutyl alcohol, methyl Carbitol, and the like. The choice of the particular desiccant to be employed will depend upon such factors as the properties of the desiccant itself, the composition and subsequent utilization of the gases being dehydrated and the desired dew point on the dehydrated gas.

For example, in a system such as that illustrated in FIGURE 1 and wherein it is desired to chill the gas and desiccant to temperatures in the order of −30 to −35° F., it is preferred not to employ triethylene glycol as the desiccant because said triethylene glycol becomes too viscous for practical operation when chilled to temperatures much below +30° F. In such instances ethylene glycol is a preferred desiccant. On the other hand, in a system such as that illustrated by the combination of FIGURE 2 with the regenerator 39 of FIGURE 1 wherein the feed gas is not usually chilled to temperatures below about +30° F., and wherein the gas separated from the rich desiccant in gas-liquid separator 52 is employed as stripping gas in regenerator 39, triethylene glycol is a preferred desiccant. When the gas so separated from the rich desiccant is to be so employed as stripping gas, ethylene glycol is usually not a preferred desiccant because it is difficult to concentrate ethylene glycol (from a practical standpoint) to the point where the dissolved gas separated from the rich desiccant will be sufficiently dry to be employed as stripping gas.

The following examples will serve to further illustrate our invention.

*Example 1*

A stream of natural gas having some higher boiling normally liquid hydrocarbons associated therewith is dehydrated in the system illustrated in FIGURE 1 employing ethylene glycol as the liquid desiccant. In said operation said gas is passed through conduit 10, mixed with lean ethylene glycol from conduits 12 and 14, passed through chillers 11 and 16, and the resulting mixture passed into separator 18 wherein a separation between dehydrated gas, condensate, and rich (wet) ethylene glycol is effected as described above. The heated wet ethylene glycol is withdrawn from leg 33 of separator 18 via conduit 35 and introduced into conduit 44 with sufficient of said wet ethylene glycol being passed through heat exchange coil 37 to provide reflux in tower portion 38.

The wet ethylene glycol is passed through heat exchange coil 47 and into gas-liquid separator 52. Gases withdrawn overhead from gas-liquid separator 52 are passed to a flare via conduits 57 and 55. Wet ethylene glycol is introduced into regenerator 39 via conduit 58.

Prior to our invention, when the wet ethylene glycol phase in separator 18 was not heated, prior to its introduction into regenerator 39 (as in leg 33), to a temperature sufficient to desorb the dissolved higher boiling normally liquid hydrocarbons therefrom but insufficient to separate water vapor therefrom, and was passed via conduits 74 and 58 into regenerator 39, said dissolved hydrocarbons separated in regenerator 39 and accumulated in lower section 72 on top of the regenerated glycol with resultant operating difficulties as described above. When operating in accordance with our invention as described herein, said difficulties are eliminated because said higher boiling hydrocarbons are desorbed in leg 33 and pass through conduit 24 into absorber 26 where they can be conveniently recovered from the absorption oil employed in absorber 26.

Typical operating conditions for this example are set forth in Table I below.

Kettle (bottom of section 72):
    Temperature _____ 385° F.
Dry gas (conduit 88):
    Dew point _____ 6° F.

When no stripping gas is used, and at the same kettle temperature of 385° F., the dry gas dew point is normally 20 to 22° F. Thus, this example illustrates the advantages of employing a stripping gas in regeneration vessel 39 in accordance with the invention.

It will be evident to those skilled in the art that the invention is not limited to any specific operating conditions per se on the individual processing steps. The actual temperatures, quantities of desiccant, etc. employed will depend upon such factors as the particular desiccant employed, the composition of the gas being dehydrated, the subsequent utilization of the dehydrated gas, the desired dew point on the gas, etc. Those skilled in the art will have no difficulty in selecting suitable operating conditions for a particular gas dehydration operation in view of this disclosure and a study of same.

While the invention has been particularly described as applied to dehydrating natural gas and residue gas from natural gas, the invention is also applicable for the dehydration of other gases. For example, cracked gases from refinery operations, hydrogen, nitrogen, carbon dioxide or any other gas which needs to be dehydrated can be

TABLE I

| Stream or Vessel No. | 10 | 12 and 14 | 13 | 17 | 35 | 43 | 48 | 58 | 76 | 29 |
|---|---|---|---|---|---|---|---|---|---|---|
| Composition—mols/day: | | | | | | | | | | |
| $CO_2$ | 846 | | | | | | | | | 803 |
| $N_2$ | 973 | | | | | | | | | 972 |
| $C_1$ hydrocarbons | 352,676 | | | | | | | | | 347,613 |
| $C_2$ hydrocarbons | 8,193 | | | | | | | | | 6,483 |
| $C_3$ hydrocarbons | 2,876 | | | | | | | | | 591 |
| $i-C_4$ | 827 | | | | | | | | | 2 |
| $n-C_4$ | 544 | | | | | | | | | 0 |
| $i-C_5$ | 239 | | | | | | | | | 0 |
| $n-C_5$ | 154 | | | | | | | | | 0 |
| $C_6$ | 180 | | | | | | | | | 0 |
| $C_7+$ | 235 | | | | | | | | | 0 |
| Total—MM s.c.f./day | 509.5 | | | | | | | | | 490.1 |
| Average mol wt. | 16.98 | | | | | | | | | 16.44 |
| Specific gravity @ 60° F. | 0.586 | | | | | | | | | 0.567 |
| Temperature, °F. | 50 | 100 | −4 | −35 | 15 | 63 | 163 | 163 | 150 | |
| Pressure, p.s.i.g. | 945 | | | | 550 | 530 | 515 | | 650 | |
| Ethylene glycol, gal./min. | | 11 | | | | | | 12 | 11 | |
| Wt. percent EG | | 75 | | | | | | 70 | 75 | |
| Wt. percent $H_2O$ | | 25 | | | | | | 30 | 25 | |
| Dew Point, °F. | | | | | | | | | | 0 |

*Example II*

A residue gas having a specific gravity of 0.63 at 60° F. and obtained by contacting a natural gas with an absorption oil is dehydrated by contacting said gas with triethylene glycol (TEG) in a countercurrent contactor of the type of vessel 83 in FIGURE 2. Rich TEG is introduced via conduit 85' into conduit 35 of FIGURE 1 and thereafter regenerated in substantially the same manner as described in Example I except that the gas removed overhead from gas-liquid separator 52 via conduit 57 is introduced via nozzle 81 into the lower section of regenerator 39 as stripping gas.

Pertinent operating conditions are set forth below:

Residue gas feed (conduit 10'):
    Volume _____ 29.5 MM s.c.f./day
    Pressure _____ 630 p.s.i.g.
    Temperature _____ 90° F.
Lean TEG (conduit 84):
    Volume _____ 7 gal./min.
    Temperature _____ 100° F.
    Wt. percent TEG _____ 99.2
Rich TEG (conduit 85'):
    Volume _____ 7 gal./min.
    Temperature _____ 125° F.
    Wt. percent TEG _____ 97.5
Stripping gas (conduit 57):
    Volume _____ 1640 s.c.f./hr.

dehydrated and the desiccant regenerated in accordance with the invention.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:
1. A process for the dehydration of a mixture of gases containing moisture, which process comprises: contacting said gases with a liquid desiccant; cooling said contacted gases and desiccant to a temperature sufficient to cause condensation of a portion of said gases; passing said cooled mixture to a separation zone and therein separating same into a substantially dry gas phase, a condensate phase, and a wet desiccant phase containing dissolved hydrocarbons including gases and higher boiling normally liquid hydrocarbons contained in said mixture of gases; indirectly applying sufficient heat to said wet desiccant phase in said separation zone to cause separation of dissolved hydrocarbons therefrom but insufficient to cause separation of water vapor therefrom by circulating a heated regenerated desiccant through said wet desiccant phase in said separation zone; passing said heated wet desiccant phase to a desiccant regeneration zone; in said regeneration zone applying sufficient additional heat to said heated wet desiccant to cause separation of water vapor therefrom and produce said heated regenerated desiccant; and recycling said heated regenerated desiccant through said wet desiccant phase in said separation zone to said contacting step.

2. A process for the dehydration of gases containing moisture, which process comprises: mixing said gases with a liquid desiccant to form a mixture; cooling said mixture to a temperature sufficient to cause condensation of a portion of said gases and form a condensate; passing said cooled mixture to a separation zone and therein separating same into a substantially dry gas phase, a condensate phase, and a wet desiccant phase containing dissolved hydrocarbons including gases and higher boiling normally liquid hydrocarbons associated with said gases; withdrawing said wet desiccant phase from said separation zone and indirectly applying sufficient heat to said wet desiccant phase during said withdrawal by circulating a heated regenerated desiccant through said wet desiccant phase to cause separation of at least a portion of said dissolved hydrocarbons therefrom but insufficient to cause separation of water vapor therefrom, which separated hydrocarbons then enter into said condensate phase; passing dry gas phase and said condensate phase from said separation zone to an absorption zone; passing said heated wet desiccant phase to a desiccant regeneration zone; in said desiccant regeneration zone, applying sufficient additional heat to said heated wet desiccant to cause separation of water vapor therefrom and produce said heated regenerated desiccant; and recycling said heated regenerated desiccant through said wet desiccant phase to said mixing step.

3. A process for the dehydration of gases containing moisture, which process comprises: mixing said gases with a liquid desiccant to form a mixture; cooling said mixture to a temperature sufficient to cause condensation of a portion of said gases and form a condensate; passing said cooled mixture to a separation zone and therein separating same into a substantially dry gas phase, a condensate phase, and a wet desiccant phase containing dissolved hydrocarbons including gases and higher boiling normally liquid hydrocarbons associated with said gases; withdrawing said wet desiccant phase from said separation zone; immediately prior to said withdrawal, indirectly applying sufficient heat to said wet desiccant phase by circulating a heated regenerated desiccant through said wet desiccant phase to cause separation of at least a portion of said dissolved hydrocarbons therefrom but insufficient to cause separation of water vapor therefrom, which separated hydrocarbons then enter into said condensate phase; passing dry gas phase and said condensate phase now containing at least a portion of said separated dissolved hydrocarbons from said separation zone to an absorption zone for further treatment; passing said heated wet desiccant phase to a desiccant regeneration zone; in said desiccant regeneration zone, applying sufficient additional heat to said heated wet desiccant to cause separation of water vapor therefrom and produce said heated regenerated desiccant; and recycling said heated regenerated desiccant through said wet desiccant phase to said mixing step.

4. A process for the dehydration of gases containing moisture, which process comprises: mixing said gases with a liquid desiccant to form a mixture; cooling said mixture to a temperature sufficient to cause condensation of a portion of said gases and form a condensate; passing said cooled mixture to a separation zone and therein separating same into a substantially dry gas phase, a condensate phase, and a wet desiccant phase containing dissolved hydrocarbons including gases and higher boiling normally liquid hydrocarbons associated with said gases; withdrawing said wet desiccant phase from said separation zone; during said withdrawal, indirectly applying sufficient heat to said wet desiccant phase by passing concentrated desiccant through said wet desiccant phase to cause separation of at least a portion of said dissolved hydrocarbons therefrom but insufficient to cause separation of water vapor therefrom, which separated hydrocarbons then enter into said condensate phase; passing said substantially dry gas phase and said condensate phase now containing at least a portion of said dissolved hydrocarbons from said separation zone to an absorption zone for further treatment; passing said withdrawn heated wet desiccant phase to a desiccant regeneration zone; indirectly heat exchanging said wet desiccant with regenerated desiccant in a lower section of said regeneration zone; passing said thus heat exchanged wet desiccant into an upper portion of said regeneration zone and therein contacting same with vapors rising from an intermediate section of said regeneration zone; flowing said thus contacted desiccant downwardly into an intermediate section and therein applying sufficient heat to said desiccant to separate water vapor therefrom and concentrate said desiccant; overflowing concentrated desiccant from said intermediate section to said lower section of said regeneration zone; withdrawing concentrated desiccant from said lower section; and recycling said withdrawn concentrated desiccant through said wet desiccant phase to said mixing step.

5. A process for the dehydration of gases containing moisture, which process comprises: contacting said gases with a liquid desiccant in a contacting zone to remove moisture therefrom and form a wet desiccant phase containing dissolved hydrocarbons including gases and higher boiling normally liquid hydrocarbons associated with said gases; withdrawing dehydrated gases from said contacting zone; withdrawing said wet desiccant phase from said contacting zone; passing said withdrawn wet desiccant phase to a desiccant regeneration zone; indirectly heat exchanging said withdrawn wet desiccant with rising vapors in the upper portion of said regeneration zone and with regenerated desiccant in a lower section of said regeneration zone and thereby applying sufficient heat to said wet desiccant phase to cause separation of at least a portion of said dissolved hydrocarbons therefrom but insufficient to cause separation of water vapor therefrom; passing said thus heated wet desiccant phase to a gas-liquid separation zone; withdrawing from said gas-liquid separation zone gases which were dissolved in said wet desiccant phase; withdrawing from said gas-liquid separation zone higher boiling normally liquid hydrocarbons which were present in said wet desiccant phase; withdrawing said thus heat exchanged and now substantially gas-free and liquid hydrocarbon-free desiccant from a lower portion of said gas-liquid separation zone and passing same into an upper portion of said regeneration zone and therein contacting same with vapors rising from an intermediate section of said regeneration zone; flowing said thus contacted desiccant downwardly into an intermediate section and therein applying sufficient heat to said desiccant to remove water vapor therefrom and concentrate said desiccant; overflowing concentrated desiccant from said intermediate section to said lower section of said regeneration zone; passing said separated gases from said gas-liquid separation zone into said lower section of said regeneration zone as a stripping gas and, during said overflowing of concentrated desiccant from said intermediate section to said lower section, contacting said concentrated desiccant with said stripping gas; withdrawing concentrated desiccant from said lower section; and recycling said withdrawn concentrated desiccant to said mixing step.

6. Apparatus for the dehydration of gases, comprising, in combination: a gas inlet conduit; heat exchange means disposed in said gas inlet conduit; a lean desiccant conduit connected with said gas inlet conduit upstream from said heat exchange means; a separator vessel connected to the downstream end of said gas inlet conduit; a leg attached to the bottom of and in open communication with the interior of said separator vessel; a desiccant regeneration vessel; heating means including a heat exchange coil disposed within said leg and connected to said desiccant regeneration vessel for passing hot regenerated desiccant through said coil; a weir disposed within said separator vessel downstream from said leg; first conduit means connected to said separator vessel downstream from said weir for withdrawing from said separator vessel fluids which overflow said weir; and second conduit means connected to the lower portion of said leg and said regeneration vessel.

7. Apparatus for the dehydration of gases, comprising, in combination: a gas inlet conduit; heat exchange means disposed in said gas inlet conduit; a lean desiccant conduit connected with said gas inlet conduit upstream from said heat exchange means; a separator vessel connected to the downstream end of said gas inlet conduit; a leg attached to the bottom of and in open communication with the interior of said separator vessel; a heat exchange coil disposed within said leg, the outlet of said coil being connected to the inlet of said lean desiccant conduit; a weir disposed within said separator vessel downstream from said leg; first conduit means connected to said separator vessel downstream from said weir for withdrawing from said separator vessel fluids which overflow said weir; a desiccant regeneration vessel; second conduit means connected to the lower portion of said leg and said regeneration vessel; and a regenerated desiccant conduit connected at one end to the lower portion of said regeneration vessel and at its other end to the inlet end of said heat exchange coil.

8. Apparatus for the dehydration of gases, comprising, in combination: a gas inlet conduit; indirect heat exchange means disposed in said gas inlet conduit; a lean desiccant conduit connected with said gas inlet conduit upstream from said heat exchange means; a separator vessel connected to the downstream end of said gas inlet conduit; a leg attached to the bottom of and in open communication with the interior of said separator vessel; heating means including a heat exchange coil disposed within said leg; a weir disposed within said separator vessel downstream from said leg; first conduit means connected to said separator vessel downstream from said weir for withdrawing from said separator vessel fluids which overflow said weir; a desiccant regeneration vessel comprising substantially an upright shell provided with a lower section, an intermediate section separated from said lower section by a partition having at least one downcomer opening therein, and a tower section disposed above said intermediate section; a first heat exchange coil in said lower section; a second heat exchange coil in said intermediate section; a third heat exchange coil in the upper portion of said tower section; vapor-liquid contact means disposed in said tower section below said third heat exchange coil; an upwardly extending downcomer pipe attached to said partition and surrounding said downcomer opening therein; vapor-liquid contact means disposed in said downcomer pipe; a second upwardly extending pipe, covered at its upper end by a cap, and surrounding said downcomer pipe with its lower end extending toward but not reaching said partition; a second conduit means connecting the lower portion of said leg, said third heat exchange coil, and said first heat exchange coil; a third conduit means connecting said first heat exchange coil and said tower section; and a fourth conduit means connecting the lower portion of said lower section of said shell and said heating means disposed within said leg for passing regenerated desiccant through said heating means.

9. An apparatus according to claim 8 wherein there is provided, in further combination: an absorption tower; means for introducing lean absorption oil into the upper portion of said absorption tower; means for withdrawing rich absorption oil from the lower portion of said absorption tower; conduit means connected to the upper portion of said absorption tower for passing residue gas therefrom to said indirect heat exchange means disposed in said gas inlet conduit; and wherein the outlet of said first conduit means is connected to said absorption tower.

10. Apparatus for the dehydration of gases, comprising, in combination: a gas inlet conduit; heat exchange means disposed in said gas inlet conduit; a lean desiccant conduit connected with said gas inlet conduit upstream from said heat exchange means; a separator vessel connected to the downstream end of said gas inlet conduit; a leg attached to the bottom of and in open communication with the interior of said separator vessel; heating means disposed within said leg; a weir disposed within said separator vessel downstream from said leg; first conduit means connected to said separator vessel downstream from said weir for withdrawing fluids which overflow said weir from said separator vessel; a desiccant regeneration vessel comprising substantially an upright shell provided with a lower section, an intermediate section separated from said lower section by a partition having at least one downcomer opening therein, and a tower section disposed above said intermediate section; a first heat exchange coil in said lower section; a second heat exchange coil in said intermediate section; a third heat exchange coil in the upper portion of said tower section; vapor-liquid contact means disposed in said tower section below said third heat exchange coil; an upwardly extending downcomer pipe surrounding said downcomer opening in said partition; vapor-liquid contact means disposed in said downcomer pipe; a second upwardly extending pipe, covered at its upper end by a cap, and surrounding said downcomer pipe with its lower end extending toward but not reaching said partition; a second conduit means connected to the lower portion of said leg, the inlet and the outlet of said third heat exchange coil, and the inlet of said first heat exchange coil; a gas-liquid separator vessel; a third conduit means connected to the outlet of said first heat exchange coil and said gas-liquid separator vessel at an intermediate point thereof; a liquid withdrawal conduit connected to the lower portion of said gas-liquid separator vessel and said tower section of said regeneration vessel; a gas withdrawal conduit connected at one end to the upper portion of said gas-liquid separator vessel; and a fourth conduit means connected to the lower portion of said lower section of said regeneration vessel for withdrawing regenerated desiccant therefrom.

11. Apparatus for the dehydration of moisture-containing gases, comprising, in combination: a contact tower for contacting said gases with a lean liquid desiccant to absorb moisture therefrom and form a moisture-laden desiccant; a desiccant regeneration vessel comprising substantially an upright shell provided with a lower section, an intermediate section separated from said lower section by a partition having at least one downcomer opening therein, and a tower section disposed above said intermediate section; a first heat exchange coil in said lower section; a second heat exchange coil in said intermediate section; a third heat exchange coil in the upper portion of said tower section; vapor-liquid contact means disposed in said tower section below said third heat exchange coil; an upwardly extending downcomer pipe surrounding said downcomer opening in said partition; vapor-liquid contact means disposed in said downcomer pipe; a second upwardly extending pipe, covered at its upper end by a cap, and surrounding said downcomer pipe with its lower end extending toward but not reaching said partition; a first conduit means connected to the lower portion of said contact tower, the inlet and the outlet of said third heat exchange coil, and the inlet of said first heat exchange coil; a gas-liquid separator vessel; a second conduit means connected to the outlet of said first heat exchange coil and said gas-liquid separator vessel at an intermediate point thereof; a liquid withdrawal conduit connected to the lower portion of said gas-liquid separator vessel and said tower section of said regeneration vessel; a gas withdrawal conduit connected at one end to the upper portion of said gas-liquid separator vessel and at its other end to said lower section of said regeneration vessel at an intermediate point thereof; and a third conduit means connected to the lower portion of said lower section of said regeneration vessel for withdrawing regenerated desiccant therefrom.

References Cited by the Examiner

UNITED STATES PATENTS

| | | | |
|---|---|---|---|
| 2,327,187 | 8/1943 | Hill | 55—51 X |
| 2,690,814 | 10/1954 | Reid | 55—32 |
| 2,725,337 | 11/1955 | Laurence et al. | 55—80 X |
| 2,750,331 | 6/1956 | Meyers. | |
| 2,768,118 | 10/1956 | Laurence et al. | 55—80 X |
| 2,990,910 | 7/1961 | Kimmell | 55—323 |
| 3,105,748 | 10/1963 | Stahl | 55—32 |
| 3,119,674 | 1/1964 | Glasgow et al. | 55—174 X |

REUBEN FRIEDMAN, *Primary Examiner.*

C. N. HART, *Assistant Examiner.*